(12) United States Patent
Desruelle et al.

(10) Patent No.: US 8,095,128 B2
(45) Date of Patent: Jan. 10, 2012

(54) DEVICE MANAGEMENT SYSTEM FOR REMOTELY ACCESSING TERMINAL EQUIPMENTS

(75) Inventors: Frederic Desruelle, Vence (FR); Sophie Martin, La Gaude (FR); Mark G. Stockwell, South Croydon (GB); Zsolt Szalai, Tourrettes-sur-Loup (FR)

(73) Assignee: International Business Machines Corporation, Armonk, NY (US)

( * ) Notice: Subject to any disclaimer, the term of this patent is extended or adjusted under 35 U.S.C. 154(b) by 297 days.

(21) Appl. No.: 12/297,322
(22) PCT Filed: Mar. 13, 2007
(86) PCT No.: PCT/EP2007/052360

§ 371 (c)(1),
(2), (4) Date: Apr. 28, 2009

(87) PCT Pub. No.: WO2007/122043

PCT Pub. Date: Nov. 1, 2007

(65) Prior Publication Data

US 2009/0280794 A1 Nov. 12, 2009

(30) Foreign Application Priority Data

Apr. 20, 2006 (EP) ................................. 06300381

(51) Int. Cl.
*H04M 3/00* (2006.01)
(52) U.S. Cl. .................. 455/419; 455/420; 455/414.1; 455/423; 455/424; 709/221
(58) Field of Classification Search ....... 455/414.1–423; 709/217–230
See application file for complete search history.

(56) References Cited

U.S. PATENT DOCUMENTS

| | | | |
|---|---|---|---|
| 2003/0204640 A1 | 10/2003 | Sahinoja et al. | |
| 2005/0228847 A1 | 10/2005 | Hayes, Jr. | |
| 2005/0232175 A1* | 10/2005 | Draluk et al. | 370/310 |
| 2005/0234967 A1* | 10/2005 | Draluk et al. | 707/102 |
| 2006/0217111 A1* | 9/2006 | Marolia et al. | 455/418 |
| 2006/0236325 A1* | 10/2006 | Rao et al. | 719/315 |
| 2007/0093243 A1* | 4/2007 | Kapadekar et al. | 455/419 |
| 2007/0169093 A1* | 7/2007 | Logan et al. | 717/168 |

FOREIGN PATENT DOCUMENTS

| | | |
|---|---|---|
| EP | 1315330 A1 | 5/2003 |
| EP | 1 515 571 A2 | 3/2005 |
| JP | 2002537706 A | 11/2002 |
| JP | 2005085280 A | 3/2005 |
| JP | 2005085281 A | 3/2005 |
| WO | WO 2007/122043 A1 | 11/2007 |

OTHER PUBLICATIONS

PCT, "Notification of Transmittal of the International Search Report and the Written Opinion of the International Searching Authority, or the Declaration", Date of Mailing Jun. 13, 2007, International Application No. PCT/EP2007/052360.

(Continued)

*Primary Examiner* — Ajit Patel
*Assistant Examiner* — Erica Navar
(74) *Attorney, Agent, or Firm* — Douglas A. Lashmit; Hoffman Warnick LLC

(57) ABSTRACT

A device management system for remotely setting parameters to Terminal Equipments connected to a network comprises a Terminal Equipment management application (210), servers connected to the network, each supporting a different remote management protocol, and means (200) for, upon a generic functionality-oriented request (307) from the Terminal Equipment management application, and for each one of the Terminal Equipments:

- querying (305) a database (300, 301, 302, 303) of profiles containing all the objects supported by each Terminal Equipment;
- determining a remote management protocol if more than one is supported by each Terminal Equipment;
- mapping said generic functionality-oriented request into a request specific to each Terminal Equipment; and
- sending a command to each Terminal Equipment through the server (121) supporting the determined protocol.

13 Claims, 6 Drawing Sheets

OTHER PUBLICATIONS

OMA, Open Mobile Alliance, "OMA Device Management Tree and Description", XP-002360958, Candidate Version 1.2, Dated Jun. 15, 2005, pp. 1-48.

Shinya Mayama, Information Materials for IDS, JPO Office Action, Dated Aug. 23, 2011, 2 pages.

* cited by examiner

| Make | A | |
|---|---|---|
| Model | X | |
| Operating System Version | 3,6 | |
| DM client Version | 1,1 | |
| Protocol | OMA DM | |

| Label | Key | Terminal Display | Object Address | Max Occurrence | Allowed Values | Access Type (get/replace/add/delete) |
|---|---|---|---|---|---|---|
| Email Settings | email | | ./mail | 1 | | G,R |
| | | | | | | |
| Email Account Node | email$account$ | | ./mail/<x> | 6 | | A,G,R,D |
| | | | | | | |
| Account Name | email$account$name | Account | ./mail/<x>/Acc | 1 | | A,G,R |
| User parameters | | | | | | |
| E-mail Address | email$account$usrAddress | My address | ./mail/<x>/uAddr | 1 | | A,G,R |
| User ID | email$account$usrID | My name | ./mail/<x>/uID | 1 | | A,G,R |
| User Password | email$account$usrPW | My password | ./mail/<x>/uPW | 1 | | A,R |
| User Name | email$account$usrName | | ./mail/<x>/uName | 1 | | A,G,R |
| Receive Parameters | | | | | | |
| Receive Server Name | email$account$recName | | | | | |
| Receive Server Address | email$account$recAddress | Incoming mail server | ./mail/<x>/mRec | 1 | | A,G,R |
| Receive Port Number | email$account$recPort | | | | | |
| Server Protocol | email$account$recProtocol | Maibox type | ./mail/<x>/mProt | 1 | POP3/IMAP4 | G,R |
| Check Mail Interval | email$account$recInterval | | | | | |
| Automatic Download | email$account$recDownload | | | | | |
| Send Parameters | | | | | | |
| Send Server Name | email$account$sndName | | | | | |
| Send Server Address | email$account$sndAddress | Outgoing mail server | ./mail/<x>/mSend | 1 | | G,R |
| Send Port Number | email$account$sndPort | | | | | |
| Send when | email$account$sndWhen | | | | | |
| Mail Options | | | | | | |
| Sign mail? | email$account$optSign | | | | | |
| Signature | email$account$optSignature | | | | | |
| Send copy to self | email$account$optCopySelf | | | | | |
| BCC Outgoing | email$account$optBCCOut | | | | | |
| BCC Outgoing Address | email$account$optBCCOutAddress | | | | | |
| Security parameters | | | | | | |
| Security mechanism | email$account$secMechanism | Security | ./mail/<x>/ConSec | 1 | OFF/TLS/SSL | G,R |
| Use SMTP Authentication | email$account$secSMTPAuth | | ./mail/<x>/SMTPauth | 1 | True/False | G,R |
| SMTP Authentication ID | email$account$secSMTPAuthID | | ./mail/<x>/SMTPID | 1 | | G,R |
| SMTP Authentication Pwd | email$account$secSMTPAuthPW | | ./mail/<x>/SMTPPW | 1 | | R |
| Plain Text SMTP Auth | email$account$secSMTPTxtAuth | | | | | |
| APOP Secure Login | email$account$secAPOPLogin | | | | | |
| Data account for E-mail | | | | | | |
| Pointer to Data Account | email$account$conAccountID | Connection | ./mail/ToNapID | 1 | URI | G,R |

FIG. 4

| | | | | | | |
|---|---|---|---|---|---|---|
| Make | A | | | | | |
| Model | X | | | | | |
| Operating System Version | 3,6 | | | | | |
| DM client Version | | | | | | |
| Protocol | OMA CP | | | | | |
| Label | Key | Terminal Display | Object Address | Max Occurrence | Allowed Values | Access Type (get/replace/add/delete) |
| Email Settings | email | | Email | 1 | | |
| Email Account Node | email$account$ | | Email/<node> | 6 | | |
| Account Name | email$account$name | Account | Email/<node>/NAME | 1 | | |
| User parameters | | | | | | |
| E-mail Address | email$account$usrAddress | My address | Email/<node>/ADDR | 1 | | |
| User ID | email$account$usrID | My name | Email/<node>/AUTHNAME | 1 | | |
| User Password | email$account$usrPW | My password | Email/<node>/AUTHPWD | 1 | | |
| User Name | email$account$usrName | | | | | |
| Receive Parameters | | | | | | |
| Receive Server Name | email$account$recName | | | | | |
| Receive Server Address | email$account$recAddress | Receive server | Email/<node>/RCVADDR | 1 | | |
| Receive Port Number | email$account$recPort | | Email/<node>/RCVPORT | 1 | 110/143/993/995 | |
| Server Protocol | email$account$recProtocol | Mailbox type | Email/<node>/RCVTYPE | 1 | POP3/IMAP4 | |
| Check Mail Interval | email$account$recInterval | | | | | |
| Automatic Download | email$account$recDownload | | | | | |
| Send Parameters | | | | | | |
| Send Server Name | email$account$sndName | | | | | |
| Send Server Address | email$account$sndAddress | Send server | Email/<node>/SNDADDR | 1 | | |
| Send Port Number | email$account$sndPort | | Email/<node>/SNDPORT | 1 | 25/465 | |
| Send when | email$account$sndWhen | | | | | |
| Mail Options | | | | | | |
| Sign mail | email$account$optSign | | | | | |
| Signature | email$account$optSignature | | | | | |
| Send copy to self | email$account$optCopySelf | | | | | |
| BCC Outgoing | email$account$optBCCOut | | | | | |
| BCC Outgoing Address | email$account$optBCCOutAddress | | | | | |
| Security parameters | | | | | | |
| Security mechanism | email$account$secMechanism | Security | Email/<node>/CONSEC | 1 | OFF/TLS/SSL | |
| Use SMTP Authentication | email$account$secSMTPAuth | | Email/<node>/APPAUTH | 1 | | |
| SMTP Authentication ID | email$account$secSMTPAuthID | | Email/<node>/APPAUTH/AAUTHNAME | 1 | | |
| SMTP Authentication Pwd | email$account$secSMTPAuthPW | | Email/<node>/APPAUTH/AAUTHSECRET | 1 | | |
| Plain Text SMTP Auth | email$account$secSMTPTxtAuth | | | | | |
| APOP Secure Login | email$account$secAPOPLogin | | | | | |
| Data account for E-mail | | | | | | |
| Pointer to Data Account | email$account$conAccountID | Connection | Email/<node>/TONAPID | 1 | Data account name | |

FIG. 5

| Make | B | |
|---|---|---|
| Model | Y | |
| Operating System Version | 2.2.5 | |
| DM client Version | 1,1 | |
| Protocol | OMA DM | |

| Label | Key | Terminal Display | Object Address | Max Occurrence | Allowed Values | Access Type (get/replace/add/delete) |
|---|---|---|---|---|---|---|
| Email Settings | email | | | | | |
| | | | | | | |
| Email Account Node | email$account$ | Email | ./Ext/Email | 1 | | G,R |
| | | | | | | |
| Account Name | email$account$name | | | | | |
| User parameters | | | | | | |
| E-mail Address | email$account$usrAddress | Address | ./Ext/Email/Addr | 1 | | A,G,R |
| User ID | email$account$usrID | User name | ./Ext/Email/UserID | 1 | | A,G,R |
| User Password | email$account$usrPW | Password | ./Ext/Email/UserPW | 1 | | A,R |
| User Name | email$account$usrName | | | | | |
| Receive Parameters | | | | | | |
| Receive Server Name | email$account$recName | | | | | |
| Receive Server Address | email$account$recAddress | Receive server | ./Ext/Email/RCVAddr | 1 | | A,G,R |
| Receive Port Number | email$account$recPort | Receive Port | ./Ext/Email/RCVPort | 1 | 110/143/993/995 | A,G,R |
| Server Protocol | email$account$recProtocol | | | | | |
| Check Mail Interval | email$account$recInterval | Check mail every | ./Ext/Email/Interval | 1 | 5/15/30/60/360/1440 | A,G,R |
| Automatic Download | email$account$recDownload | Download images | ./Ext/Email/Download | 1 | True/False | A,G,R |
| Send Parameters | | | | | | |
| Send Server Name | email$account$sndName | | | | | |
| Send Server Address | email$account$sndAddress | Outgoing mail server | ./Ext/Email/SNDAddr | 1 | | A,G,R |
| Send Port Number | email$account$sndPort | Send Port | ./Ext/Email/SNDPort | 1 | 110/143/993/995 | A,G,R |
| Send when | email$account$sndWhen | | | | | |
| Mail Options | | | | | | |
| Sign mail | email$account$optSign | Sign mail | ./Ext/Email/Sign | 1 | True/False | A,G,R |
| Signature | email$account$optSignature | Signature | ./Ext/Email/Signature | 1 | | A,G,R |
| Send copy to self | email$account$optCopySelf | Send copy to self | ./Ext/Email/CopySelf | 1 | True/False | A,G,R |
| BCC Outgoing | email$account$optBCCOut | | | | | |
| BCC Outgoing Address | email$account$optBCCOutAddress | | | | | |
| Security parameters | | Security | | | | |
| Security mechanism | email$account$secMechanism | | | | | |
| Use SMTP Authentication | email$account$secSMTPAuth | | | | | |
| SMTP Authentication ID | email$account$secSMTPAuthID | User ID for send | ./Ext/Email/SMTPID | 1 | | A,G,R |
| SMTP Authentication Pwd | email$account$secSMTPAuthPW | Password for send | ./Ext/Email/SMTPPW | 1 | | A,R |
| Plain Text SMTP Auth | email$account$secSMTPTxtAuth | | | | | |
| APOP Secure Login | email$account$secAPOPLogin | | | | | |
| Data account for E-mail | | | | | | |
| Pointer to Data Account | email$account$conAccountID | Connection | ./Ext/Email/ToNapID | 1 | | A,G,R |

FIG. 6

DEVICE MANAGEMENT SYSTEM FOR REMOTELY ACCESSING TERMINAL EQUIPMENTS

FIELD OF THE INVENTION

The present invention relates to device management in general, and more particularly to a device management for remotely setting parameters to Terminal Equipments.

BACKGROUND OF THE INVENTION

Device management is here referred to as the capability to reach out from a central location, to one or a group of mobile devices to remotely manage them. It is typically implemented by a telecommunications operator, but also within the enterprise or by a providers of service offerings such as configuring their clients' mobile devices. Specific sub-domains of device management are also implemented by mobile device vendors.

Mobile devices may be for example mobile phones, Personal Digital Assistants, notebook and laptop computers, SIM cards, vehicle-embarked computers, SmartHome gateways, Internet appliances etc. For the purpose of this patent application, they will be referred to as Terminal Equipment.

Remote management actions requiring the capability to reach out to Terminal Equipments could be, without limitation, involved in the following Terminal Equipment management applications: Initial Provisioning (Bootstrap) of devices, Device re-configuration (Continuous Provisioning), Real-time hardware, software & configuration inventory of devices, Software distribution & management (applications, Operating System, any software), Remote device problem determination, Back-up and restore of configuration data, Network, device, application and service performance monitoring & management, etc.

Enablement on Terminal Equipment side of the management services accessed by the Terminal Equipment requires setting up Terminal Equipments with a complete and correct set of parameter values. If a Terminal Equipment has not been pre-provisioned for the management service, or whenever modifications are required, the end-user has to configure the Terminal Equipment, manually and locally, through its display menus unless a specialist (e.g. Telecommunications operator support personnel) can perform the operation remotely. Technologies exist today which allow to remotely perform parameters settings to a network-connected Terminal Equipment. However, while providing the necessary foundation for remote Terminal Equipment configuration management, these technologies as a whole fall short when it comes to leveraging them in Terminal Equipment management applications that can be deployed for practical Terminal Equipment and end-user remote support.

Further, device management has in the last few years been affected by several significant evolution factors:
- a continuous increase in the sophistication of mobile Terminal Equipments which has made them more complex to handle by the end-user
- a diversification in the types of Terminal Equipments that participate in the mobile communications
- an evolving portfolio of management services, as permitted by the continuous development of the telecommunications industry and of Terminal Equipments technology
- at the same time, the end-user has become less technology-savvy, not more, and has raised his/her expectations in terms of quality of experience. This has lead for the telecommunications operator or the enterprise, to a very costly management service desk support.

There remains to be devised a device management system that would all at the same time involve any management action against any Terminal Equipment, help improve customer satisfaction, be cost effective and, in the case of a service provider or a telecommunications operator, allow for new business processes and associated revenues.

SUMMARY OF THE INVENTION

The present invention is defined by the system set out in the appended claim 1. More particularly, there is devised a device management system for remotely setting parameters of Terminal Equipments connected to a network. The system comprises:
- a Terminal Equipment management application;
- a first server connected to the network, supporting a first remote management protocol; and
- an Abstraction Layer for, upon a generic functionality-oriented request from the Terminal Equipment management application, and for each one of the Terminal Equipments:
    - querying a database of profiles containing supported objects in the first remote management protocol;
    - gathering from the profiles and the supported objects at least one object address corresponding to the generic functionality-oriented request; and
    - sending a request to set parameters through the first server using the at least one object address.

In one embodiment the device management system also comprises a second server connected to the network, supporting a second remote management protocol, and means in the Abstraction Layer for determining one remote management protocol between the first and the second remote management protocols, and applying the steps of querying, gathering and sending in relation to the determined remote management protocol and server supporting it between the first and the second servers.

In another embodiment, the first server in the device management system supports at least one other remote management protocol, and the system comprises means in the Abstraction Layer for determining one remote management protocol between the first and the second remote management protocols, and applying the steps of querying, gathering and sending in relation to the determined remote management protocol.

In a further embodiment, information in the profiles includes:
- a characterization of the Terminal Equipment by its make, model, and operating system version or device management client version, and its supported remote management protocol; and
- a key for each of the supported objects.

A configuration service is also devised for remotely setting parameters for the installed base of Terminal Equipments for a customer using the device management system according to the invention.

The foregoing, together with other objects, features, and advantages of this invention can be better appreciated with reference to the following specification, claims and drawings.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

FIG. 1 shows prior art implementation of MMS service involving two different remote management protocols and two different Terminal Equipments supporting the same protocol FIG. 4 shows one logical group of objects for a first Terminal Equipment in a first protocol, illustrative of the Terminal Equipment profiles included in a database used in the device management system according to the invention FIG. 5 shows the same logical group of objects for the same first Terminal Equipment in a second protocol FIG. 6 shows the same logical group of objects for a second Terminal Equipment in a first protocol

DETAILED DESCRIPTION OF THE INVENTION

The following description is presented to enable one of ordinary skill in the art to make and use the invention. For sake of clarity, the description is first made in relation to a particular first management service and business process; Multi-media Messaging Service (MMS) is one example of a management service that is being offered by telecommunications operators. Access to the management service requires setting up the Terminal Equipment with a complete and correct set of parameter values.

Figure 1:
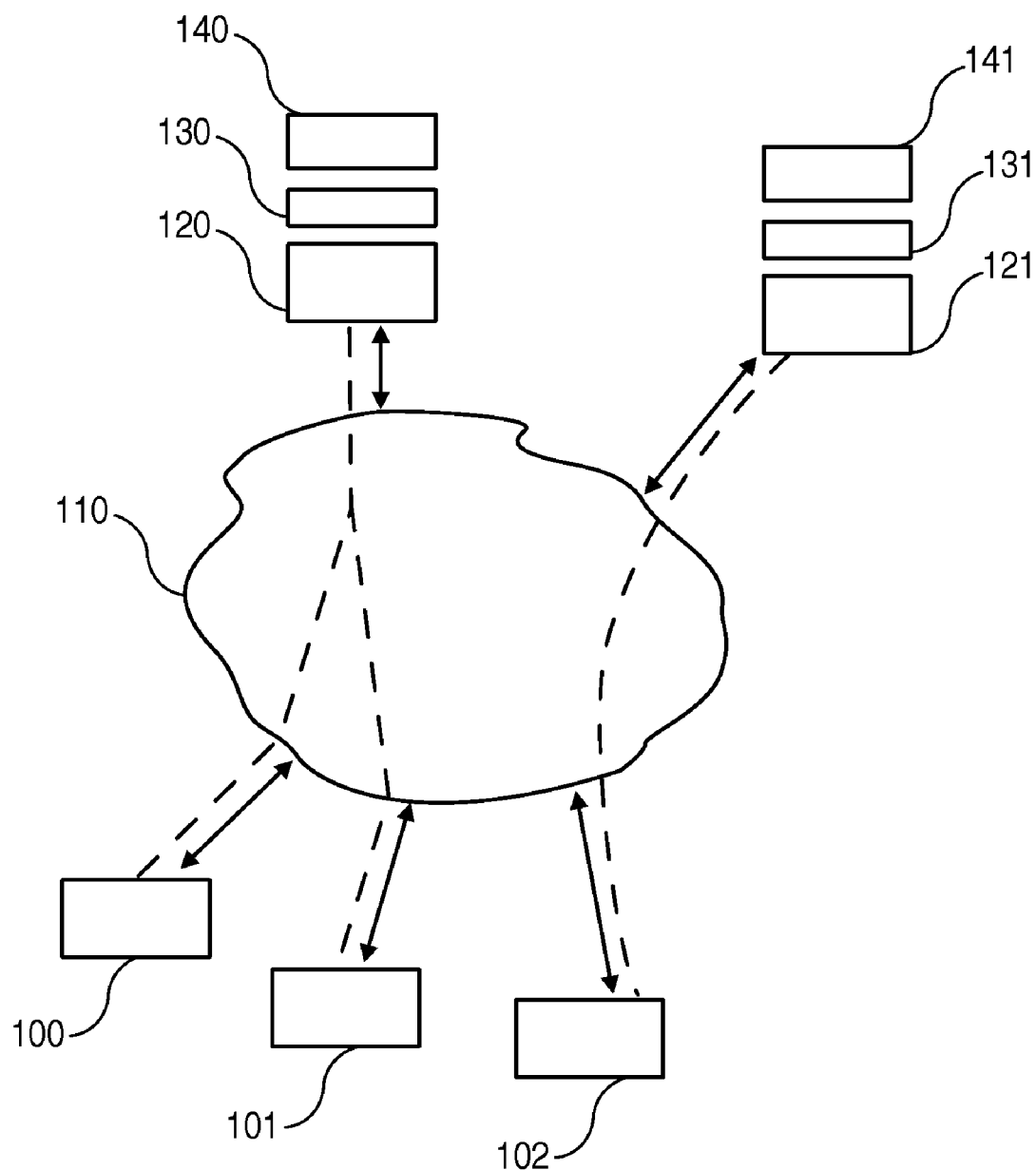

Turning to FIG. 1, there is a typical example of a network (110) to which are connected Terminal Equipments (100, 101) of different brands and models, but both supporting open remote management protocol OMA DM (Open Mobile Alliance Device Management), and a Terminal Equipment (102) supporting another open protocol the OMA CP protocol (Open Mobile Alliance Client Provisioning). The network may wireless or wired. Other Terminal Equipments, not shown on FIG. 1, could also typically support certain other, including proprietary, protocols.

An example of Terminal Equipment management application, a Customer Care application (140) of a telecommunications operator runs on a server (120) for managing Terminal Equipments supporting OMA DM, on top of Application Programming Interface (API) (130). Since today on the market, not one single technology can address the full spectrum of Terminal Equipments providing a given functionality, another Customer Care application (141) runs on a server (121) for managing Terminal Equipments supporting OMA CP, on top of API (131).

The respective Customer Care applications manage the MMS service and send parameters to the managed Terminal Equipments. The actual command sent to the Terminal Equipment will differ in the Terminal Equipment 102 and 100 or 101 cases because the supported protocols are different. Besides, the implementation of the representation of given parameters across any one protocol varies from one Terminal Equipment brand/model to another.

Looking now specifically at Terminal Equipments 100 and 101 and their OMA DM protocol support, the actual command sent will differ between Terminal Equipment 100 and Terminal Equipment 101. This is because the addresses of the objects addressing a same MMS parameter are different in the respective Terminal Equipment 100 and 101 implementations. The open OMA DM protocol presents the characteristic to specify the format for the addressing of individual objects (addressing called Uniform Resource Identifier (URI) in the OMA DM protocol). However, the OMA DM specifications do not prescribe the object addresses themselves except for a very limited and largely incomplete set of objects.

The OMA DM specifications do not provide the notion of a self-contained group of objects needing to be addressed together coherently. Still using the MMS example, OMA DM specifications do not list the set of parameters that a complete and coherent definition of the MMS function has to include. The set of MMS-related objects, as a consequence, varies from one Terminal Equipment brand/model implementation to another.

While discussed with respect to OMA DM, it is to be noted that most if not all remote management protocols inherently leave open implementation options when it comes to certain object addressing or to certain objects that a management service has to include.

Our example Terminal Equipment 100 could be sent a series of OMA DM Add commands that would target the object addresses below:

```
./MMS/DeleteConfirmation
./MMS/Account1/MMSCenter
./MMS/Account1/Validity
./MMS/Account1/RejectAnonymous
./MMS/Account1/DataConnection
./MMS/Account2/MMSCenter
./MMS/Account2/Validity
./MMS/Account2/RejectAnonymous
./MMS/Account2/DataConnection
```

Terminal Equipment 101 is a different brand/model, and could be sent a series of OMA DM Replace commands that target a different set of URI's:

```
./MMS/DelConf
./MMS/MMSCtr
./MMS/Val
./MMS/RejAnonym
./MMS/DataAcc
```

Finally, Terminal Equipment 102, supporting a different open remote management protocol, could be sent a WAP Push SMS built from the parameter set similar to the example below:

```
<characteristic type="APPLICATION">
<parm name="APPID" value="w4"/>
<parm name="NAME" value="MMS Center"/>
<parm name="ADDR" value="http://telecom.operator.com/mmsc"/>
</characteristic>
```

Each and every Terminal Equipment management application development for device management has therefore to include and maintain a representation down to the details of the protocol and of the management objects addresses for the diversity presented by the set of Terminal Equipments it targets. This significantly complexities the design of such applications, increases the development costs, slows down the delivery, and has lead in fact to the release of multiple, specialized applications, where each addresses only a specific subset of the Terminal Equipment spectrum.

Figure 2:
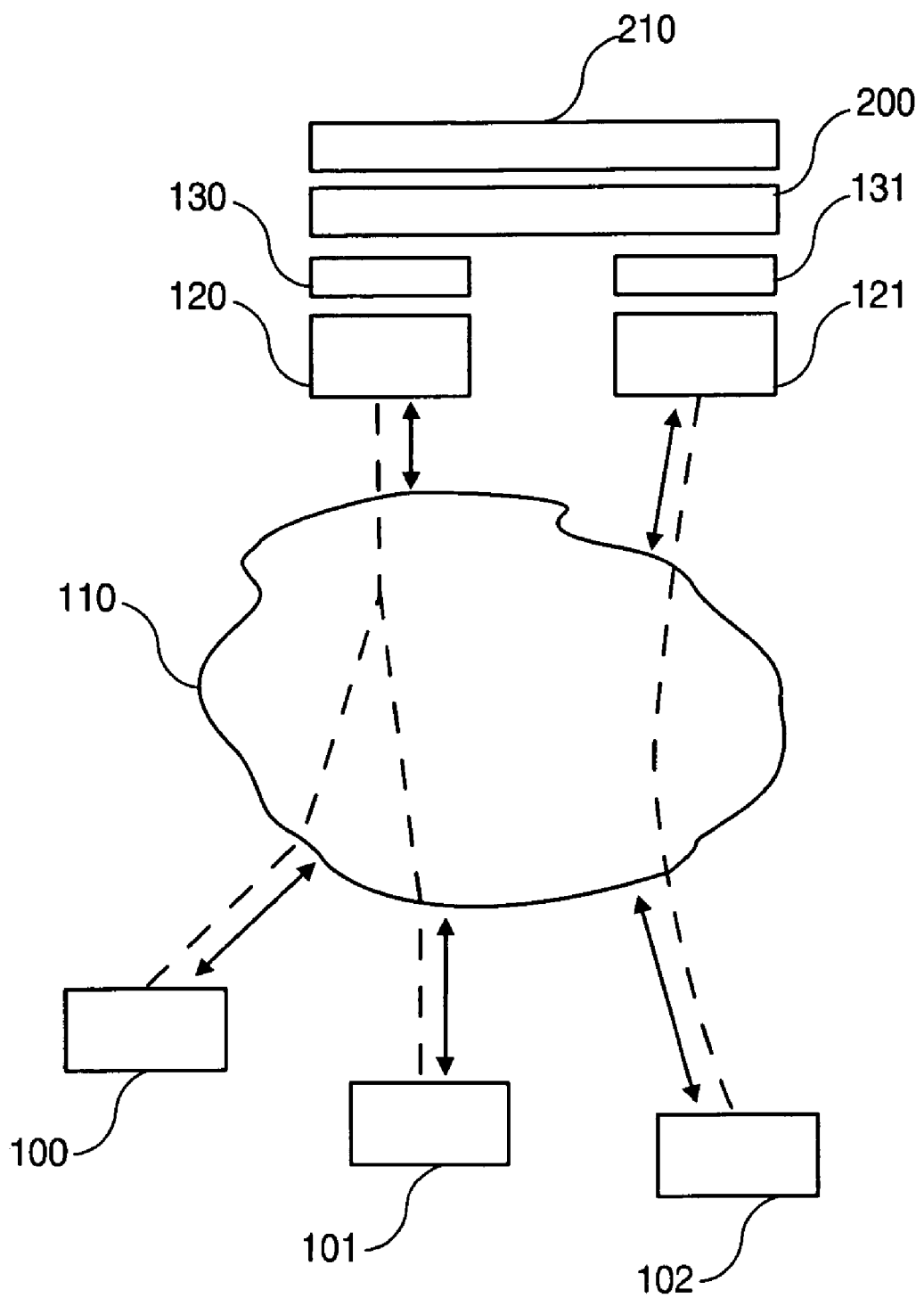
FIG. 2 shows implementation of MMS service involving two different remote management protocols and two different Terminal Equipments supporting the same protocol, according to the present invention

FIG. 2 describes the present invention which allows a software application provider to more easily develop an integrated and consistent set of Terminal Equipment management applications addressing large portions of the Terminal Equipment spectrum.

The invention consists of an Abstraction Layer (200) implemented on top of the management protocol servers (two in our example: 120, 121) through APIs (130, 131). Customer Care application (210) sits on top of the Abstraction Layer. The actual set of commands to Terminal Equipments 100, 101 and 102 is the same as the set mentioned above with respect to FIG. 1.

The Abstraction Layer transforms diverse Terminal Equipment-specific device management client implementation realities into an as generic as possible set of management services. Terminal Equipment management applications, such as the Customer Care Application, make use of the Abstraction Layer services by submitting generic, Terminal Equipment functionality oriented requests. The Abstraction Layer identifies the management protocol and server that are appropriate to fulfill the request, and prepares and submits the corresponding request to each server through its API.

A comparison with FIG. 1 highlights the benefits of the Abstraction Layer for the Terminal Equipment management application development: such applications no longer need to include and maintain the knowledge of the protocol supported by the Terminal Equipments to be managed, nor the knowledge of the specific object implementation under a given protocol. In the specific case of the OMA DM protocol, the applications no longer need to include and maintain the knowledge of the OMA DM object representation exposed by the specific OMA DM Client implementations. Applications thereby become significantly cheaper and quicker to develop. Moreover, a single application, by using the Abstraction Layer services, can span across multiple management protocols.

Figure 3:
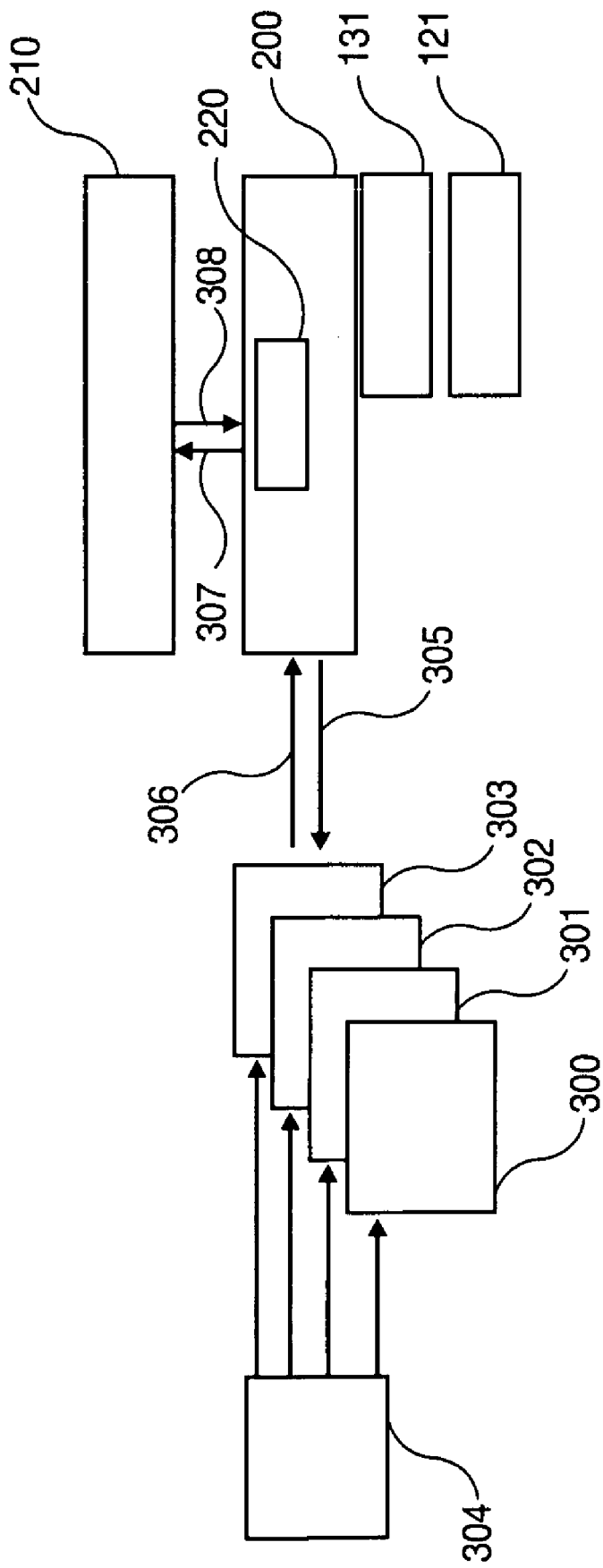
FIG. 3 shows a more detailed view of the device management system according to the invention

FIG. 3 shows a more detailed view of the system according to the invention. Customer Care application 210 sends the Abstraction Layer 200 a device management request (308) to set up Terminal Equipments with a complete and correct set of parameter values. Device management feedback (307) reports to Customer Care application 210 on the result of the device management action.

Abstraction Layer API (220) provides to Customer Care application 210 the set of commands and the programming interface that Abstraction Layer 200 is capable of handling.

The Abstraction Layer makes use of a database of profiles (300, 301, 302, 303) of known Terminal Equipments types, together with the various management protocols supported by each type. A Terminal Equipment type is typically characterized by its make and model. Depending on the manufacturer, the Terminal Equipment may also be further characterized for remote management capability, by its operating system version, its device management client version, or both. Creation and maintenance of the database profiles 300, 301, 302, 303 is part of administration functions (304). Such functions will not be described with further details, as certain ways of implementing them are known to the person ordinarily skilled in the art.

As the base to achieve the object mapping, administration functions 304 add and maintain in the database profiles 300, 301, 302, 303 for each Terminal Equipment type, containing all the objects supported by such Terminal Equipment. Objects within the profile are structured so that objects belonging to a same logical group are grouped together, and objects can be sequenced in a particular way within a logical group. A careful design of the profile structure greatly helps the Abstraction Layer implementation to become highly generic. An example of a set of objects in a particular logical group in relation to E-mail service is given further down and described in connection with FIGS. 4 to 6.

Using Terminal Equipments' characteristics (make, model, and, if applicable, operating system version and/or device management client version), the Abstraction Layer queries (305) the database and its profiles 300, 301, 302, 303 to determine (306) which device management protocols are supported by the specific Terminal Equipment for which a device management request 308 has been received. In case of more than one protocol being supported, the Abstraction Layer makes a selection of one protocol to fulfill the request. Selection criteria are not described here as not being core to the invention, and may be devised by the person ordinarily skilled in the art. The selected protocol in turn determines which management protocol server is to be invoked. In this case, we will assume server 121 and its API 131.

For the selected particular device management protocol, Terminal Equipment functions are represented by sets of objects that vary in scope (different set of parameters for the same function) or implementation (different object address for a parameter supporting the same function), the Abstraction Layer further performs a mapping of the generic device management request 308 to the actual object implementation in the specific Terminal Equipment, as received through 306. The Abstraction Layer API's 220 role is thus to expose abstracted services to Terminal Equipment management applications.

E-mail is another example of a service that is being offered by telecommunications operators and service providers. An example of an abstract service request is here "configureE-mail", accompanied by the list of parameters requested to be configured. The description is now continued in relation to this particular second service and business process, and in connection with FIG. 4 to 6.

FIG. 4 shows one logical group of objects for a first Terminal Equipment in a first protocol, illustrative of the Terminal Equipment profiles 300, 301, 302, 303.

The Terminal Equipment is characterized by its make ("A"), model ("X"), its operating system version ("3.6"), and its device management client version ("1.1") listed in the profile. The supported protocol for this profile is "OMA DM".

The profile provides for objects in connection with a logical group "Email Settings".

A "label" column gives a set of human-readable labels, one per listed object. This set of labels is the same throughout all profiles 300, 301, 302, 303 in the database.

A "key" column gives a set of unique identifiers, one per listed object. These keys or identifiers are used for communication between Abstraction Layer API 220, and Customer Care application 210. This set of keys is the same throughout all profiles 300, 301, 302, 303 in the database.

A "Terminal Display" column gives a corresponding entry in the Terminal Equipment display menus if one exists.

An "Object Address" column gives an address for the one objects supported both by the Terminal Equipment and the protocol.

Other columns ("Max Occurrences", "Allowed Values", "Access Type") provide for certain other attributes of the object.

FIG. 5 shows one logical group of objects for the same first Terminal Equipment in a second protocol, illustrative of the Terminal Equipment profiles 300, 301, 302, 303.

The Terminal Equipment is characterized by its make ("A"), model ("X"), and its operating system version ("3.6") listed in the profile. The supported protocol for this profile is "OMA CP".

"Label" and "key" columns are identical to that of FIG. 4.

"Terminal Display" column gives the same entries as in FIG. 4 (same Terminal Equipment).

Then the next four columns ("Object Address", Max Occurrences", "Allowed Values", "Access Type") give entries specific to the combination Terminal Equipment/protocol.

FIG. 6 shows one logical group of objects for a second Terminal Equipment in the same first protocol (OMA DM), illustrative of the Terminal Equipment profiles 300, 301, 302, 303.

The Terminal Equipment is characterized by its make ("B"), model ("Y"), its operating system version ("2.2.5"), and its device management client version ("1.1") listed in the profile. The supported protocol for this profile is "OMA DM".

"Label" and "key" columns are identical to that of FIG. 4 or FIG. 5.

A "Terminal Display" column gives a corresponding entry in the Terminal Equipment display menus if one exists.

Then the next four columns ("Object Address", Max Occurrences", "Allowed Values", "Access Type") give entries specific to the combination Terminal Equipment/protocol.

Not all columns and information as laid out in FIGS. 4-6 are necessary for the invention to be operational: at a minimum, a characterization of the Terminal Equipment is necessary (make, model, operating system version or device management client version, as well as supported remote management protocol), as well as the "Key" information and the "Object Address" information.

Service providers will offer, using the device management system according to the invention, a service of setting parameters in the installed base of Terminal Equipment of their customers. This is made possible because the APIs of customer's servers, if any, are either published by servers' manufacturers, or communicated to the service provider by its customers. Service providers have to include and maintain database profiles 300, 301, 302, 303 for each one of the various Terminal Equipments present in the installed base of their customers; this is made possible because Terminal Equipments characteristics are published or may be retrieved by polling the network, with means that are not described here but are within reach of the person ordinary skilled in the art.

Although illustrative embodiments of the present invention have been described herein with reference to the accompanying drawings, it is to be understood that the present invention is not limited to those precise embodiments, and that various other changes and modifications may be effected therein by one skilled in the art without departing from the scope or spirit of the invention. All such changes and modifications are intended to be included within the scope of the invention as defined by the appended claims.

The invention claimed is:

1. A device management system for remotely setting parameters of mobile devices connected to a network comprising:
a Terminal Equipment management application;
a first server connected to the network, supporting a first remote management protocol;
a second server connected to the network, supporting a second remote management protocol, different from the first remote management protocol;
the system comprising an Abstraction Layer for, upon a generic functionality-oriented request from the Terminal Equipment management application for a selected one of the mobile devices:
identifying which of the first or the second remote management protocols is supported by the selected mobile device;
querying a database of profiles containing supported objects in the identified remote management protocol;
gathering from the profiles and the supported objects at least one object address corresponding to the generic functionality-oriented request for the selected mobile device; and
sending a request to set parameters for the selected mobile device through the first server or the second server, based on which of the first server or the second server is associated with the identified remote management protocol, using the at least one object address.

2. The device management system of claim 1 wherein said first server supports a third remote management protocol, different from the first and the second remote management protocols;
the Abstraction Layer further configured for:
identifying which of the first, second or third remote management protocols is supported by the selected mobile device;
querying a database of profiles containing supported objects in the identified remote management protocol;
gathering from the profiles and the supported objects at least one object address corresponding to the generic functionality-oriented request for the selected mobile device; and
sending a request to set parameters for the selected mobile device through the first server or the second server, based on which of the first server or the second server is associated with the identified remote management protocol, using the at least one object address.

3. The device management system of claim 1 wherein information in each of the profiles includes:
a characterization of a corresponding mobile device by its make, model, and operating system version or device management client version, and its supported remote management protocol; and
a key for each of the supported objects.

4. The device management system of claim 3 wherein the key is used for communication between an API of the Abstraction Layer and the Terminal Equipment management application.

5. The device management system of claim 1, wherein the first remote management protocol is OMA DM.

6. The device management system of claim 1, wherein the second remote management protocol is OMA CP.

7. A configuration service for remotely setting parameters for an installed base of mobile devices, connected to a network, for a customer, wherein a Terminal Equipment management application, a first server, and a second server are connected to the network, wherein the first server supports a first remote management protocol, wherein the second server supports a second remote management protocol, different from the first remote management protocol, and wherein an Abstraction Layer, upon a generic functionality-oriented request from the Terminal Equipment management application for a selected one of the mobile devices, is configured to:
identify which of the first or the second remote management protocols is supported by the selected mobile device;

query a database of profiles containing supported objects in the identified remote management protocol;

gather from the profiles and the supported objects at least one object address corresponding to the generic functionality-oriented request for the selected mobile device; and send a request to set parameters for the selected mobile device through the first server or the second server, based on which of the first server or the second server is associated with the identified remote management protocol, using the at least one object address.

8. The configuration service of claim 7 wherein the first server supports a third remote management protocol, different from the first and the second remote management protocols;

the Abstraction Layer further configured for:

identifying which of the first, second or third remote management protocols is supported by the selected mobile device;

querying a database of profiles containing supported objects in the identified remote management protocol;

gathering from the profiles and the supported objects at least one object address corresponding to the generic functionality-oriented request for the selected mobile device; and sending a request to set parameters for the selected mobile device through the first server or the second server, based on which of the first server or the second server is associated with the identified remote management protocol, using the at least one object address.

9. The configuration service of claim 7, wherein information in each of the profiles includes: a characterization of a corresponding mobile device by its make, model, and operating system version or device management client version, and its supported remote management protocol; and a key for each of the supported objects.

10. The configuration service of claim 9 wherein the key is used for communication between an API of the Abstraction Layer, and the Terminal Equipment management application.

11. The configuration service of claim 7, wherein the first remote management protocol is OMA DM.

12. The configuration service of claim 7, wherein the second remote management protocol is OMA CP.

13. An Abstraction software layer embodied on a tangible computer readable medium configured to perform actions in response to a generic functionality-oriented request from a Terminal Equipment management application for a selected one of a plurality of mobile devices, the actions comprising:

identifying which of a first remote management protocol or a second remote management protocol is supported by the selected mobile device;

querying a database of profiles containing supported objects in the identified remote management protocol;

gathering from the profiles and the supported objects at least one object address corresponding to the generic functionality-oriented request for the selected mobile device; and sending a request to set parameters for the selected mobile device through a first server or a second server, based on which of the first server or the second server is associated with the identified remote management protocol, using the at least one object address.

\* \* \* \* \*